Oct. 10, 1961  E. F. MACKS  3,003,190
MOLD FOR AND A METHOD OF MOLDING UNDER
FLUID SEPARATION CONDITIONS
Filed Sept. 3, 1954
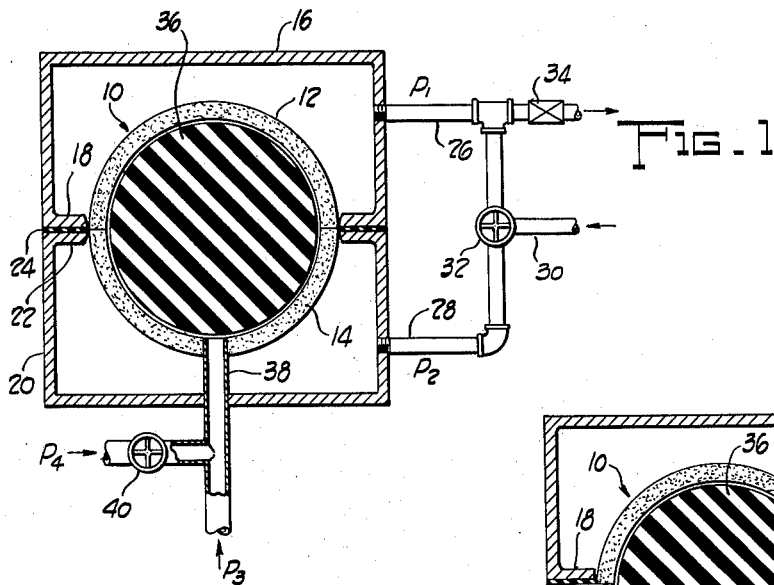
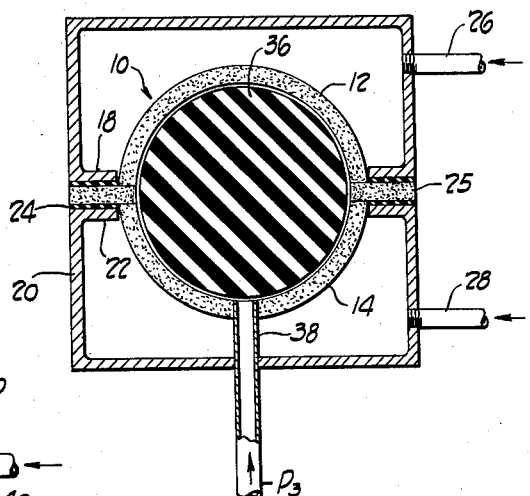
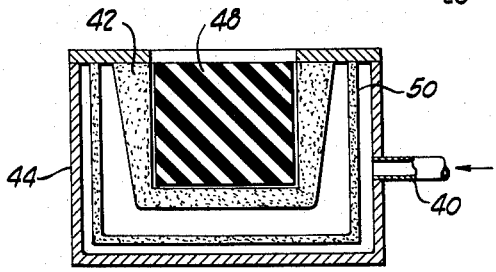
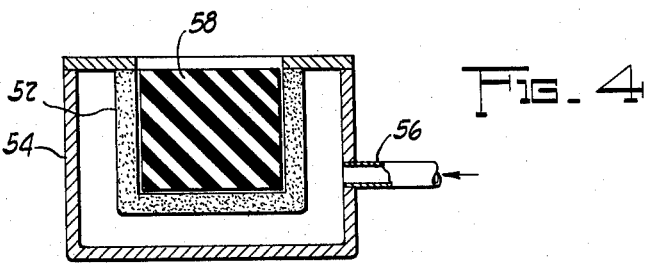
INVENTOR.
ELMER FRED MACKS
BY
ATTORNEY 3,003,190
MOLD FOR AND A METHOD OF MOLDING
UNDER FLUID SEPARATION CONDITIONS
Elmer Fred Macks, Cleveland, Ohio
(Willow Lane, Vermilion, Ohio)
Filed Sept. 3, 1954, Ser. No. 454,154
10 Claims. (Cl. 18—34)

This invention relates to apparatus and methods for molding and more particularly for apparatus and molding processes wherein the material to be molded is maintained separate from the mold during the molding operation.

An object of this invention is to provide molding apparatus in which a film of fluid is used to separate the material to be molded from the molding surface to prevent sticking.

Another object of this invention is to provide a method of molding wherein the material to be formed is held out of contact with the mold form during the forming operation.

A further object of this invention is to provide a mold for forming a moldable substance, the walls of the mold allowing the flow of fluid therethrough, be it liquid or gas, the fluid forming a supporting film for holding the substance in spaced relation to the mold wall thus preventing sticking and other deleterious effects that result from the physical contact of the moldable substance with the wall of the mold.

In the molding of plastic substances it has long been a problem in the art to prevent sticking of the substance being molded to the wall of the mold. Various expedients such as powdered soapstone have been used in order that the molded object may be removed from the mold without damage.

This invention contemplates the molding of an object under conditions wherein the object takes the shape of the mold but does not come into physical contact therewith. An apparatus which will function in this manner is disclosed herein as having the mold wall being permeable to a fluid which may be either a gas or a liquid, such a wall allowing the flow of fluid therethrough when a fluid pressure is maintained around the mold. As the fluid passes through the large number of tortuous paths in the mold wall, a pressure drop occurs when a substantial flow is produced. This pressure is available for supporting a cooperative device which has a surface confronting the wall of the mold. As the confronting surface approaches the permeable wall, the discharge of fluid from the wall is restricted by the reduction in flow area between the surface and the wall. Upon restriction by the confronting surface external of the wall the flow through the wall is materially reduced with a substantial reduction in the pressure drop through the wall. Under this condition the pressure in the film between the confronting surface and the mold wall approaches the fluid supply pressure external of the mold. It follows therefore that the thickness of the film is determined by the weight of the object being molded in its relation with the fluid supply pressure. Simple regulating devices are adequate for control of the fluid pressure since the object being molded is selfregulating in respect to the formation and maintenance of the supporting film of fluid.

Accordingly, it is one of the objects of this invention to provide a mold capable of producing a fluid film adjacent the inner wall thereof for holding the substance to be molded spaced from the wall of the mold a distance equal to the thickness of the film while the configuration of the mold is applied to the substance.

It is a further object of this invention to provide a mold having a permeable wall of varying thickness or of varying permeability for further regulating the thickness of the film and the resulting shape of the molded object.

Other objects and advantages, more or less ancillary to the foregoing, and the manner in which all the various objects are realized will appear in the following description, which, considered in connection with the accompanying drawings, sets forth the preferred embodiment of the invention.

In the drawings,
FIG. 1 is a sectional view of a closed mold assembly;
FIG. 2 is a sectional view of a modified closed mold assembly;
FIG. 3 is a sectional view of an open mold; and
FIG. 4 is a sectional view of an open mold.

Referring first to FIG. 1, a molding assembly is shown therein having a mold 10. The mold 10 is formed in two hemispherical sections 12 and 14, each having a wall of uniform thickness and being fabricated from a permeable material. The mold section 12 is disposed within a casing 16 which forms a chamber with the outer wall of the mold section 12. The section 12 is supported by a flange 18 which is affixed to the section 12 along a narrow area circumferential of the section 12. The section 14 is supported in a casing 20 which functions in a similar manner to casing 16 in that a chamber is formed in cooperation with the outer wall of section 14. A flange 22 is joined to the section 14 in a restricted area along the line of contact of sections 12 and 14. A resilient gasket 24 is located between the flanges to assure the intimate contact of the two hemispherical sections 12 and 14 in order that the inner wall of the mold 10 may be spherical in shape.

A fluid connection 26 to casing 16 and a fluid connection 28 to casing 20 are provided for conducting the fluid which passes through the mold 10 during the molding operation. The fluid used in the mold is supplied through inlet line 30 and the relative pressure in connections 26 and 28 is controlled by a differential pressure regulating valve 32 which establishes a slightly higher pressure in line 28 than that found in line 26. A bleed valve 34 vents casing 16 to the atmosphere which establishes the fluid flow from connection 28 through section 14 into the mold 10. The fluid then flows out of the mold 10 by way of section 12 to the casing 16 and through the connection 26 to the valve 34 where it is discharged from the assembly.

In FIG. 2, a modified form of the mold assembly shown in FIG. 1 is illustrated with like parts having like numbers. The flanges 18 and 22 are spaced to receive a pair of gaskets 24 and a ring 25 therebetween. The ring 25 is permeable to the flow of fluid and has the periphery open to the outside of the casings 16 and 20. With the use of the permeable ring 25, fluid would be supplied through lines 26 and 28 and would enter the mold 10 through sections 12 and 14. The discharge from the mold 10 would be through the permeable ring 25. The differential pressure provided by an auxiliary valve such as valve 32 would produce a slightly higher pressure in connection 28 than that in connection 26. Connections 26 and 28 would be made flexible if required to open and close the mold in removing the molded object.

The substance 36 being molded is conducted into the interior of mold 10 by an inlet conduit 38 which communicates with the mold 10 and is connected to a lower portion of the section 14. The conduit 38 passes through the wall of the casing 20 and is connected to the apparatus that supplies the molding substance 36 under pressure. A valved connection 40 is made to the conduit 38 for introducing fluid to the conduit 38 in order that the molding substance therein may be forced into the mold and the neck usually formed on the molded object would be eliminated.

With the mold 10 closed and a fluid such as air or other curing liquid or gas passing into casing 20 through section 14 to the interior of the mold, the substance 36 is introduced through the conduit 38 to the mold 10 where it is supported by the fluid passing through the section 14. As the mold 10 fills up the fluid entering the mold passes around the substance 36 and is discharged through the section 12 to the casing 16, connection 26, bleed valve 34 where it is dumped. When the mold 10 is completely filled, a film of fluid is maintained by the continuous flow through the sections 12 and 14 thus holding the substance 36 spaced from the inner wall of the mold 10 and allowing the outer surface of the substance 36 to conform to the shape of the inner wall of the mold 10. If it is desired a valved connection 40 may be opened just prior to the filling of the mold 10 and the molding substance in the conduit 38 may be injected into the mold 10. When the mold is opened, the molded substance 36 may be easily removed since it has not contacted the wall of the mold 10 and become affixed thereto. By increasing the pressure surrounding the molding substance 48, denser castings may be obtained. Also, the control of pressure in the fluid during a curing cycle may produce prestressing in the surface to reduce fatigue in the finished product. These effects are available by making simple adjustments in the fluid supply control valves.

In FIG. 3 a mold assembly is shown wherein the mold 42 is open at the top and has walls of varying cross section. The mold 42 is carried in a casing 44 which has a fluid inlet connection 46 made thereto. The outer wall of the mold 42 communicates with the chamber formed by the casing 44 and the fluid entering the casing 44 by way of connection 46 may flow through the mold 42, thus producing a film between the inner wall of the mold 42 and the substance 48 being molded. By utilizing a mold 42 in which the wall thickness varies, it is possible to control the thickness of the film and the resulting shape of the molded article. This function may be obtained by a mold 42 with uniform cross section, the permeability of the wall being controlled to obtain the desired results. A permeable diffusor or filter 50 is disposed between the inlet 46 and the outer mold of the wall 42 to clean the fluid if required and to insure the uniform distribution of fluid to the mold 42 in order to better obtain the desired film uniformity.

In FIG. 4 a mold assembly is shown wherein the mold 52 is uniform in wall thickness and permeability and is supported within a casing 54. The casing 54 is connected to a source of fluid under pressure by inlet connection 56 made to the interior of the casing 54. The substance 58 being molded is placed therein and is supported out of contact with the walls of the mold 52 by the passage of the fluid therethrough, thus obtaining absolute uniformity in the molded product while preventing sticking and consequent damage to the mold and product. It is noted that hot or cold fluids in the form of gases or liquids may be used to promote the curing or setting of the moldable substance. Further, venting is automatically obtained since the mold is permeable to the flow of gas. The mold is particularly adaptable to techniques presently in use such as roto casting or centrifugal casting. Also a gas capsule may be used as a pressure source to assist in the formation of the molded object.

Although the foregoing description is necessarily of a detailed character, in order that the invention may be completely set forth, it is to be understood that the specific terminology is not intended to be restrictive or confining; and that various rearrangements of parts and modifications of design may be restored to without departing from the scope or spirit of the invention as herein claimed.

What is claimed is:

1. A mold comprising a permeable member having a cavity therein and an outlet from the cavity, the premeability of said member increasing as the distance from said outlet increases, a casing surrounding said member, a diffusor intermediate said casing and said member, and fluid supply means connected with said casing for introducing fluid into the casing for passage through said diffusor and said permeable member.

2. A mold comprising a sectional permeable member configured to the shape of the article to be molded, a sectional casing surrounding said member, baffle means disposed between said member and the casing for separating the casing into a plurality of chambers, inlet means for conducting material to be molded into said member, and pressure supply means connected to each chamber for continuously supplying fluid under predetermined pressure, and regulating means in said fluid supply means for producing a predetermined pressure differential between said chambers.

3. A mold comprising, first and second mold cavity defining walls, each such wall having an inner cavity defining surface and an outer chamber surface, said cavity defining surfaces together defining a confinement cavity having the complete contour of an object to be molded, a casing fixed to each said wall, each casing and the associated body chamber surface defining a fluid pressure chamber, said walls each being permeable over substantially the entire area of the cavity defining surfaces, means to introduce and maintain a quanity of fluid under pressure in each said chamber, and said molds defining outlet passages to permit such fluid to escape from said cavity, whereby to provide a device in which substantially constant fluid pressure is maintained in the pressure chambers and fluid flows through said permeable walls to maintain a constant moving film of fluid over all of the cavity defining surfaces when a quantity of material to be molded is in the cavity.

4. A mold comprising, first and second mold cavity defining walls, each such wall having an inner cavity defining surface and an outer chamber surface, said cavity defining surfaces together defining a confinement cavity having the complete contour of an object to be molded, a casing fixed to each said wall, each casing and the associated body chamber surface defining a fluid pressure chamber, said walls each being permeable over substantially the entire area of the cavity defining surfaces, means to introduce and maintain a quantity of fluid under pressure in each said chamber, a quantity of material being molded in said cavity, a moving film of such fluid surrounding said material and between the material and the cavity defining walls and said molds defining outlet passages to permit such fluid to escape from said cavity.

5. The method of molding comprising, providing a sectioned mold having a cavity defined by porous walls and having fluid outlets connecting the cavity with the exterior of the mold, maintaining a quantity of fluid under pressure adjacent the exterior of the porous walls to cause fluid under pressure to pass through the mold walls and into the mold cavity, placing a quantity of material to be molded in the cavity to substantially fill the cavity, surrounding the material with such fluid by continuing to pass fluid through the walls while the material is disposed in the cavity to create a material supporting film of such fluid between the material and the walls, allowing the fluid to escape through said outlets continuously to cause the fluid in said film to be moving, molding the material while the material is totally supported on said film of fluid.

6. The method of hardening a material by molding, which method comprises, providing a sectional mold having a cavity defined by porous walls and having fluid outlets connecting the cavity with the exterior of the mold, introducing a quantity of fluid under pressure into the mold cavity by continuously maintaining a quantity of fluid under pressure adjacent the exterior of the porous walls to cause fluid under pressure to pass through the walls of the mold, substantially filling the cavity with a quantity of material to be molded while such material is in a non-shape retaining condition, surrounding the material with a film of such fluid by continuing to pass such fluid under pressure through the walls and simultaneously allowing such fluid to continuously escape through the outlet to create a load supporting film of such fluid between the material and the walls, maintaining the material on said film of fluid out of contact with the mold cavity, molding the material while the material is totally supported on said film of fluid.

7. The method of hardening a material by molding, which method comprises, providing a sectional mold having a cavity defined by porous walls and having fluid outlets connecting the cavity with the exterior of the mold, introducing a quantity of fluid under pressure into the mold cavity by continuously maintaining a quantity of fluid under pressure adjacent the exterior of the porous walls to cause fluid under pressure to pass through the walls of the mold, substantially filling the cavity with a quantity of material to be molded while such material is in a non-shape retaining condition, surrounding the material with a film of such fluid by continuing to pass such fluid under pressure through the walls to create a load supporting film of such fluid between the material and the walls, forming and maintaining a region of reduced pressure comunicating with said outlets to continuously draw the fluid from said film through said outlets, maintaining the material on said film of fluid out of contact with the mold cavity, molding the material while the material is totally supported on said film of fluid.

8. The method of molding with a section of mold wherein each such section has a permeable wall defining a part of a mold cavity and a chamber external of said wall and wherein said walls together define a cavity having the contour of the object to be molded and the chambers surround the walls, said method comprising, substantially filling the mold cavity with a quantity of material to be molded while the material is in a non-shape retaining condition, continuously introducing a supply of fluid under pressure to one of said chambers while said material is in said cavity, surrounding the material with a film of fluid by causing said fluid to pass through one of said wall sections to form a moving film of fluid between the cavity walls and the material being molded, drawing the fluid in said film through said wall and into another of said chambers by providing a region of reduced pressure in said other chamber, and molding said material while maintaining said material on said film and out of contact with said mold cavity.

9. A mold comprising a sectioned permeable member defining a cavity having the contour of an object to be molded, a casing surrounding said member and defining a fluid pressure space between the member and the casing, baffle means connecting the member to the casing to divide the space into a plurality of closed pressure chambers, fluid supply means connected to the casing and communicating with one of the pressure chambers to introduce fluid under pressure into said one pressure chamber, and vent means connected to the casing and communicating with another of said pressure chambers to withdraw fluid supplied by said fluid pressure means after the fluid has passed from said one pressure chamber through said one section of said permeable member into said cavity and thence out through another section of said permeable member into said other pressure chamber.

10. A mold comprising, a permeable member having a cavity therein, said member having generally vertical side walls of tapered thickness, said tapered side walls flaring outwardly from the bottom to the top, a casing surrounding the member, and fluid supply means connected with the casing for introducing fluid into the casing for passage through said permeable member.

References Cited in the file of this patent

UNITED STATES PATENTS

| | | |
|---|---|---|
| 1,281,577 | Jagenburg | Oct. 15, 1918 |
| 1,592,536 | O'Neill | July 13, 1926 |
| 2,233,570 | Absmeier | Mar. 7, 1941 |
| 2,331,000 | Shaefer | Oct. 5, 1943 |
| 2,387,886 | Devol | Oct. 30, 1945 |
| 2,528,643 | Dubbs | Nov. 7, 1950 |
| 2,627,641 | Steele et al. | Feb. 10, 1953 |
| 2,632,227 | Steele et al. | Mar. 24, 1953 |
| 2,776,452 | Chavannes | Jan. 8, 1957 |